United States Patent
McMullan et al.

(10) Patent No.: US 10,552,832 B2
(45) Date of Patent: Feb. 4, 2020

(54) SYSTEM AND METHOD FOR PROCESSING FINANCIAL TRANSACTIONS FUNDED VIA LIMITED USE VIRTUAL PAYMENT NUMBERS

(71) Applicant: MasterCard International Incorporated, Purchase, NY (US)

(72) Inventors: Ciaran McMullan, Dublin (IE); John Robert Forrest, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 715 days.

(21) Appl. No.: 13/900,105

(22) Filed: May 22, 2013

(65) Prior Publication Data

US 2014/0351127 A1    Nov. 27, 2014

(51) Int. Cl.
*G06Q 20/10* (2012.01)
*G06Q 20/38* (2012.01)

(52) U.S. Cl.
CPC ................. *G06Q 20/385* (2013.01)

(58) Field of Classification Search
CPC .................................................. G06Q 20/385
USPC ......................................................... 705/44
See application file for complete search history.

(56) References Cited

U.S. PATENT DOCUMENTS

| | | | |
|---|---|---|---|
| 6,636,833 B1 | 10/2003 | Flitcroft et al. | |
| 7,136,835 B1 * | 11/2006 | Flitcroft | G06Q 20/00 705/35 |
| 7,431,207 B1 * | 10/2008 | Neemann et al. | 235/380 |
| 7,567,934 B2 | 7/2009 | Flitcroft et al. | |
| 7,571,142 B1 | 8/2009 | Flitcroft et al. | |
| 7,593,896 B1 | 9/2009 | Flitcroft et al. | |
| 9,092,776 B2 * | 7/2015 | Dessert | G06Q 20/40 |
| 9,123,040 B2 * | 9/2015 | Kelly | G06Q 20/382 |
| 9,690,853 B2 * | 6/2017 | Davis | G06Q 20/383 |
| 2009/0276356 A1 * | 11/2009 | Scipioni | G06Q 20/10 705/41 |
| 2010/0265311 A1 * | 10/2010 | Carpenter, Jr. | G06Q 10/00 348/14.08 |

(Continued)

OTHER PUBLICATIONS

"The road to mobile payment services" Sep. 2011 McKinsey on Payments 8 pages (Year: 2011).*

*Primary Examiner* — Bruce I Ebersman
(74) *Attorney, Agent, or Firm* — Buchanan Ingersoll & Rooney PC

(57) ABSTRACT

A method for processing a financial transaction funded via a virtual payment number includes: receiving, by an input device of a merchant, product details for at least one product to be purchased in a financial transaction; receiving, by the input device, a virtual payment number; receiving, by the input device, an indication of the virtual payment number as being a limited use number associated with a payment account, wherein said merchant can recognize said virtual payment number as a limited use number; generating, by a processing device, an authorization request for a financial transaction, wherein the authorization request includes at least transaction data, the virtual payment number, and a data element, wherein the data element indicates the virtual payment number as a limited use number; and transmitting, by a transmitting device, the authorization request to a payment network.

10 Claims, 7 Drawing Sheets

100

(56) References Cited

U.S. PATENT DOCUMENTS

2011/0153437 A1* 6/2011 Archer ................... G06Q 20/10
                                              705/17
2012/0330836 A1* 12/2012 Aidasani ............ G06Q 20/4012
                                              705/44
2014/0101044 A1* 4/2014 Blackhurst et al. ............ 705/44

* cited by examiner

SYSTEM AND METHOD FOR PROCESSING FINANCIAL TRANSACTIONS FUNDED VIA LIMITED USE VIRTUAL PAYMENT NUMBERS

FIELD

The present disclosure relates to the conducting of financial transactions funded via limited use virtual payment numbers, specifically the processing of financial transactions where the authorization request indicates the payment method being a limited use virtual payment number.

BACKGROUND

As the frequency of e-commerce and transactions conducted via the Internet increases, the use of virtual payment numbers (VPNs) have also increased. Virtual payment numbers generally offer consumers extra flexibility over traditional payment cards by being capable of electronic issuance and distribution, and if the virtual card number is a controlled payment number (CPN) (also known as a limited use number), allowing for the setting of various limits and controls. In addition, virtual payment numbers may often provide additional fraud protection for consumers, such as by being limited to use for a specific merchant, specific time and/or date, within a specific transaction amount, etc. Traditional methods and systems for identifying, distributing, and processing virtual payment numbers and in particular limited use numbers, may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. patent application Ser. No. 12/219,952, filed Jul. 30, 2008; U.S. patent application Ser. No. 12/268,063, filed Nov. 10, 2008; and U.S. patent application Ser. No. 12/359,971, filed Jan. 26, 2009; each of which are herein incorporated by reference in their entirety.

However, while virtual payment numbers are often used in e-commerce transactions, many merchants are apprehensive to accept virtual payment numbers for use in in-person or face-to-face transactions. In many instances, virtual payment numbers may not be provided at a point-of-sale via a physical payment card, and may instead be provided to a merchant via non-traditional methods, such as by the number displayed on the display of a smart phone or other mobile computing device. In other instances, virtual payment numbers may be provided to the merchant with the numbers having bank identification number (BIN) ranges unfamiliar to the merchant. In these types of instances, merchants may be apprehensive to accept the virtual payment number for payment, suspecting fraud or an otherwise untrustworthy situation, particularly when one considers the ease of creating or replicating a number on a display. There is a perceived technical problem present in the acceptance of virtual payment numbers at points-of-sale in a face-to-face environment.

Thus, there is a need for a technical solution to process financial transactions funded via virtual payment numbers that provides merchants with added security as to the nature of the virtual payment number being a genuine payment number.

SUMMARY

The present disclosure provides a description of systems and methods for the processing of financial transactions funded via virtual payment numbers.

A method for processing a financial transaction funded via a virtual payment number includes: receiving, by an input device of a merchant, product details for at least one product to be purchased in a financial transaction; receiving, by the input device of the merchant, a virtual payment number; receiving, by the input device of the merchant, an indication of the virtual payment number as being a limited use number associated with a payment account, wherein said merchant can recognize said virtual payment number as a limited use number; generating, by a processing device, an authorization request for a financial transaction, wherein the authorization request includes at least transaction data, the virtual payment number, and a data element, wherein the data element indicates the virtual payment number as a limited use number; and transmitting, by a transmitting device, the authorization request to a payment network.

A system for processing a financial transaction funded via a virtual payment number includes an input device, a processing device, and a transmitting device. The input device is configured to receive: product details for at least one product to be purchased in a financial transaction; a virtual payment number; and an indication of the virtual payment number as being a limited use number associated with a payment account, wherein said merchant can recognize said virtual payment number as a limited use number. The processing device is configured to generate an authorization request for a financial transaction, wherein the authorization request includes at least transaction data, the virtual payment number, and a data element, wherein the data element indicates the virtual payment number as a limited use number. The transmitting device is configured to transmit the authorization request to a payment network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

System for Processing Financial Transactions

Figure 1:
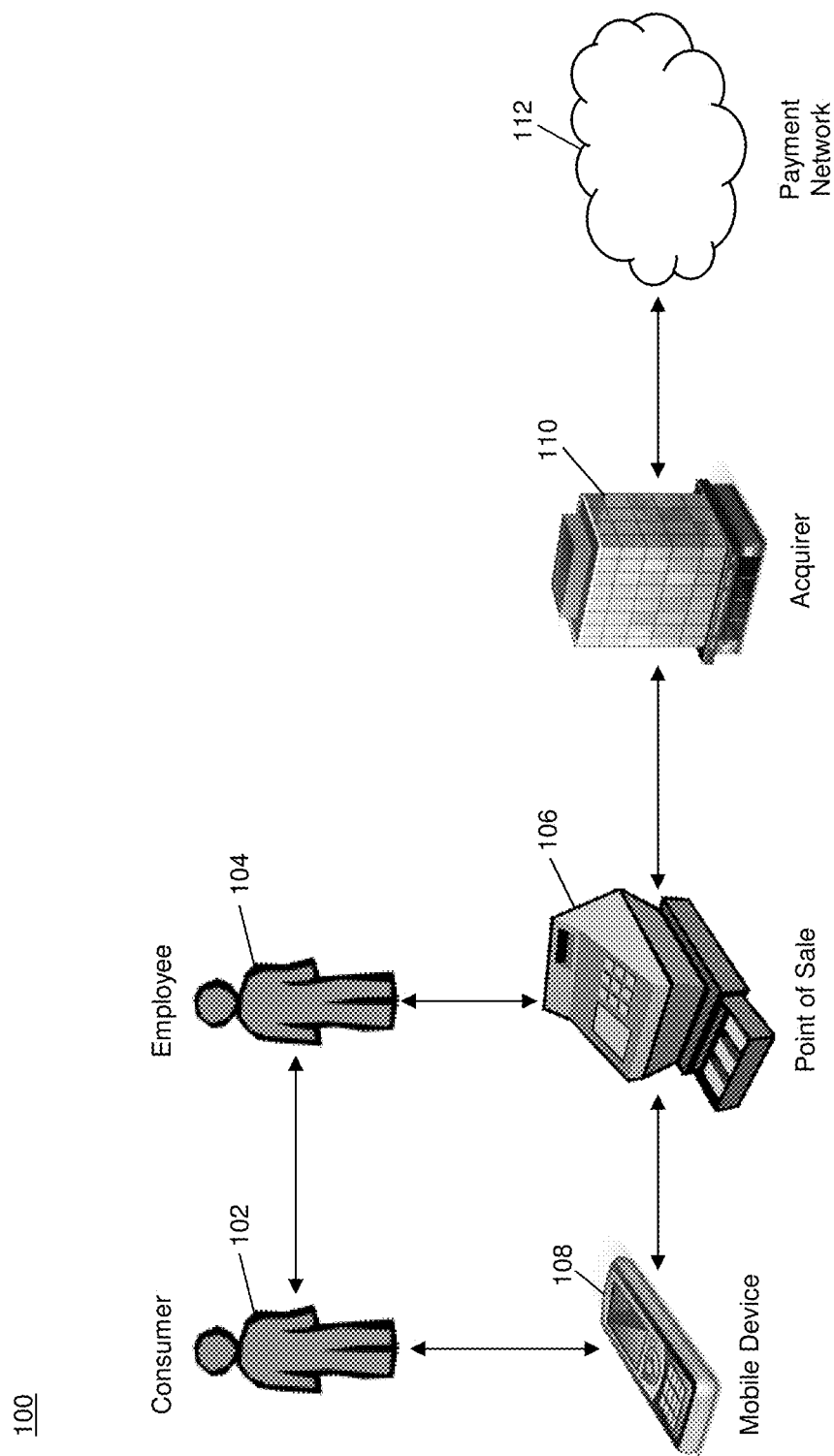
FIG. 1 is a high level architecture illustrating a system for the processing of financial transactions funded via virtual payment numbers in accordance with exemplary embodiments.

FIG. 1 illustrates a system 100 for processing financial transactions funded via a virtual payment number.

A consumer 102 may be in possession of a virtual payment number associated with a payment account. The virtual payment number may be issued to the consumer 102 via an issuer (e.g., an issuing bank), which may also issue the payment account. In some instances, the payment account may not be associated with the consumer 102, such as an instance where an account holder of the payment account may receive the virtual payment number, which they may provide to the consumer 102 to use to fund a financial transaction. For example, the account holder may gift a virtual payment number limited to a specific transaction amount and a specific merchant as a gift card.

The consumer 102 may initiate a financial transaction for the purchase of goods or services with an employee 104 of a merchant. As part of the initiation of the financial transaction, the consumer 102 may provide the employee 104 with the virtual payment number to be used as the payment method to fund the financial transaction. The employee 104 may enter the virtual payment number as part of the payment details into a point-of-sale 106. In some embodiments, the consumer 102 may orally provide the virtual payment number to the employee 104. In other embodiments, the consumer 102 may physically provide the virtual payment number 104 to the employee, such as via a piece of paper or a payment card embossed with the virtual payment number.

In another embodiment, the consumer 102 may possess a mobile device 108, such as a cellular phone, smart phone, tablet computer, etc. The mobile device 108 may display the virtual payment number to the employee 104, such as via an application program, web browser, short message service (SMS) message, multimedia message service (MMS) message, etc, and the employee 104 may enter the number into the point-of-sale 106. In yet another embodiment, the mobile device 108 may display a machine-readable code encoded with the virtual payment number, which may be read by a reading device of the point-of-sale 106. In a further embodiment, the machine-readable code may be a bar code, such as a Quick Response (QR) code. Additional methods and systems for the providing of the virtual payment number to the employee 104 and/or point-of-sale 106 will be apparent to persons having skill at the relevant art.

The point-of-sale 106 may also receive input of an indication that the virtual payment number used to fund the financial transaction is a limited use number. In some instances, the consumer 102 may notify the employee 104 of the virtual payment number being a limited use number, and the employee 104 may input the indication into the point-of-sale 106. In other instances, the reading device of the point-of-sale 106 may receive the indication of the virtual payment number being a limited use number, such as encoded in the machine-readable code that also encodes the virtual payment number. In yet another instance, the point-of-sale 106 may be configured to identify predetermined BIN ranges as being associated with limited use numbers, and thus identify a virtual payment number included in a predetermined BIN range as being a limited use number.

The point-of-sale 106 may transmit transaction information related to the financial transaction to an acquirer 110, such as an acquiring bank. The transaction information may include at least the virtual payment number, additional transaction data (e.g., transaction amount, transaction time and/or date, etc.), and the indication of the virtual payment number as a limited use number. The acquirer 110 may generate an authorization request including the transaction data and virtual payment number, and further including a data element indicating the virtual payment number as a limited use number. In one embodiment, the authorization request may be formatted pursuant to the International Organization for Standardization's ISO 8583 standard, and the data element indicating the virtual payment number as a limited use number may be a data element provided in the ISO 8583 standard. In other embodiments, the data element may be a new value included in an existing field or data element provided in the ISO 8583 standard. Additional methods for including the indication in the authorization request will be apparent to persons having skill in the relevant art. In some embodiments, the authorization request may be generated by the point-of-sale 106 and forwarded to the acquirer 110.

The acquirer 110 (e.g., or, in some embodiments, the point-of-sale 106) may transmit the generated authorization request to a payment network 112. The payment network 112 may receive the authorization request and may process the financial transaction funded by the virtual payment number using methods and systems that will be apparent to persons having skill in the relevant art. The payment network 112 may transmit an authorization response to the acquirer 110, which may be forwarded to the point-of-sale 106, indicating approval or denial of the financial transaction. For example, the authorization response may indicate denial of the financial transaction if the transaction exceeds the limits of the virtual payment number as a limited use number, such as by exceeding a transaction frequency, transaction amount, aggregated transaction amount, merchant limits, time and/or date limits, product limits, etc.

The point-of-sale 106 may display the indication of approval or denial of the financial transaction to the employee 104 and/or the consumer 102. The employee 104 and consumer 102 may then finalize the transaction accordingly, such as by providing the transacted for goods and/or services to the consumer 102 or the furnishing of a receipt for the financial transaction.

The inclusion of the additional data element indicating the virtual payment number as a limited use number may provide additional assurance to the acquirer 110 as to the fidelity of the virtual payment number. In instances where the acquirer 110 may traditionally be wary of, and thus deny, a financial transaction due to an unrecognized payment number, the indication that the unrecognized payment number is a limited use number may influence the acquirer 110 to submit the authorization request for approval. The inclusion of the data element may also be of benefit to the payment network 112, as it may enable the payment network 112 to quickly and easily identify the virtual payment number as a limited use number, which may decrease processing time, and thereby improve the overall speed and efficiency of the financial transaction.

Point-of-Sale Device

Figure 2:
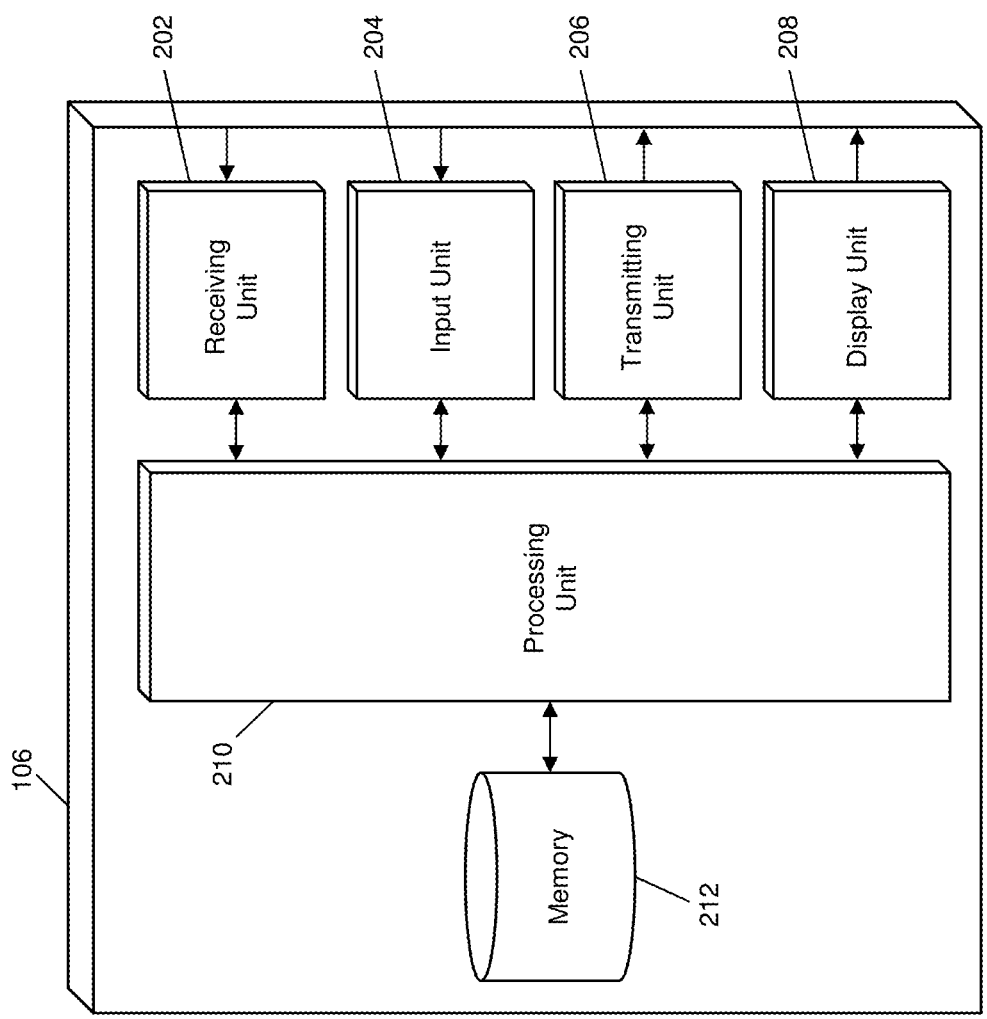
FIG. 2 is a block diagram illustrating the point-of-sale of FIG. 1 for the processing of financial transactions in accordance with exemplary embodiments.

FIG. 2 illustrates an embodiment of the point-of-sale device 106 of the system 100. It will be apparent to persons having skill in the relevant art that the embodiment of the point-of-sale 106 illustrated in FIG. 2 is provided as illustration only and may not be exhaustive to all possible configurations of the point-of-sale 106 suitable for performing the functions as discussed herein. For example, the computer system 700 illustrated in FIG. 7 and discussed in more detail below may be a suitable configuration of the point-of-sale 106. Further, the point-of-sale may be a terminal, but should be broadly construed to include a point-of-sale that includes several terminals interconnected to a local server or other processing computer, and other configurations unless otherwise specified.

The point-of-sale 106 may include an input unit 204. The input unit 204 may be comprised of one or a plurality of inputs, which may be configured to receive input from the employee 104 and/or additional sources. Inputs that may comprise the input unit 204 will be apparent to persons having skill in the relevant art, such as a keyboard, mouse, touch screen, click wheel, microphone, camera, machine-readable code reader, optical scanner, etc. The input unit 204 may be configured to receive product details for at least one product to be purchased in a financial transaction, the virtual payment number used to fund the financial transaction, and an indication that the virtual payment number is a limited use number.

The point-of-sale 106 may also include a processing unit 210. The processing unit 210 may be configured to generate an authorization request for the financial transaction including transaction data, the virtual payment number, and a data element indicating the virtual payment number as a limited use number. In some embodiments, the processing unit maybe configured to identify, based on one or more characteristics of the virtual payment number, the virtual payment number as being a limited use number. In one embodiment, the one or more characteristics may include the BIN range.

The point-of-sale 106 may further include a transmitting unit 206, configured to transmit the generated authorization request to the acquirer 110 and/or the payment network 112. A receiving unit 202 included as part of the point-of-sale 106 may be configured to receive an authorization response provided by the acquirer 110 and/or the payment network 112 in response to the authorization request, indicating approval or denial of the financial transaction. The transmitting unit 206 and receiving unit 202 may be configured to communicate via one or more protocols and/or one or more networks, such as communicating via the use of Internet Protocol (IP) addresses on the Internet.

The indication may be displayed to the employee 104 and/or the consumer 102 via a display unit 208. The display unit 108 may be any type of display suitable for displaying information to a user (e.g., the employee 104), such as a liquid crystal display (LCD), a light-emitting diode (LED) display, capacitive touch screen display, etc. The display unit 208 may also be configured to display additional information, such as transaction information that is entered by the employee 104 via the input unit 204. The processing unit 210 may be configured to process the received input for display via the display unit 208. The processing unit 210 may be configured to execute one or more application programs, which may be stored in a memory 212. The memory 212 may also be configured to store the data received by the input unit 204, for inclusion in the generated authorization request.

Methods of Processing Financial Transactions

Figure 3:
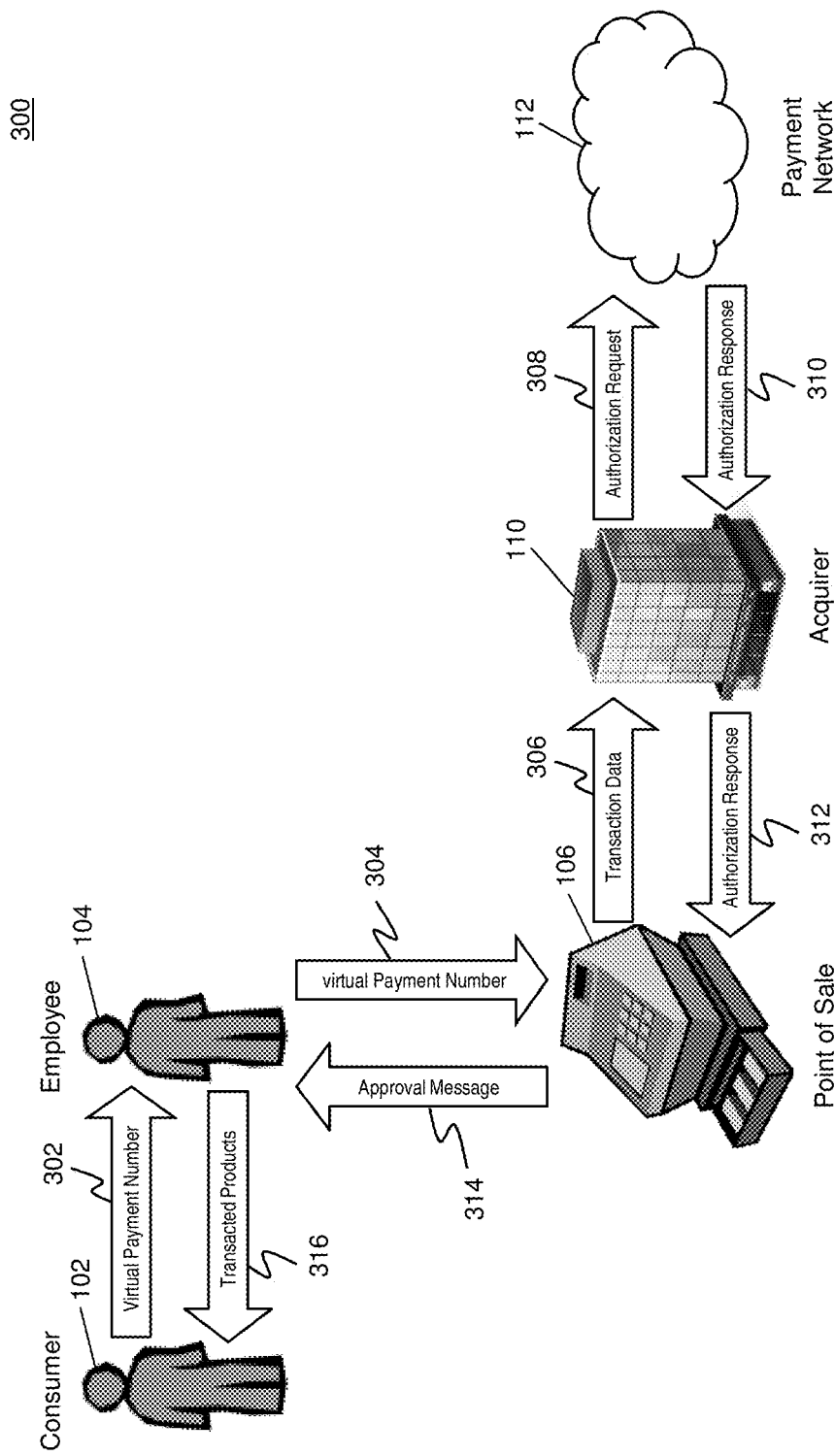
FIG. 3 is a flow diagram illustrating a method for the processing of a financial transaction funded via a virtual payment number provided by a consumer in accordance with exemplary embodiments.

FIG. 3 illustrates a method 300 for the processing of a financial transaction funded via a virtual payment number.

In step 302, the consumer 102 may provide a virtual payment number for funding of an initiated financial transaction to the employee 104. Methods for the providing of a virtual payment number from a consumer to an employee of a merchant will be apparent to persons having skill in the relevant art. In step 304, the employee 104 may input the virtual payment number into the point-of-sale 106 (e.g., via the input unit 204) and an indication of the virtual payment number as a limited use number. In some embodiments, the virtual payment number may be input using a keyboard or number pad. In other embodiments, the virtual payment number may be encoded in a machine-readable code, and may be read by an input unit 204 of the point-of-sale 106 operated by the employee 104. The point-of-sale 106 may then decide the machine-readable code (e.g., using the processing unit 210) to obtain the virtual payment number.

In step 306, the point-of-sale 106 may transmit transaction data to the acquirer 110. The transaction data may include the virtual payment number, the indication of the virtual payment number as a limited use number, and other data associated with the financial transaction, such as a transaction amount, transaction time and/or date, etc. In step 308, the acquirer 110 may generate and transmit an authorization request for the financial transaction including the transaction data to the payment network 112. The payment network 112 may then process the financial transaction and, in step 310, submit an authorization response indicating approval or denial of the financial transaction to the acquirer 110.

In step 312, the acquirer 110 may forward the authorization response to the point-of-sale 106. The point-of-sale 106 may receive the authorization response and then, in step 314, display an approval (e.g., or denial) message to the employee 104 indicating the approval of the financial transaction as indicated in the authorization response. The employee 104 may then provide the transacted for products to the consumer 102, in step 316.

Figure 4:
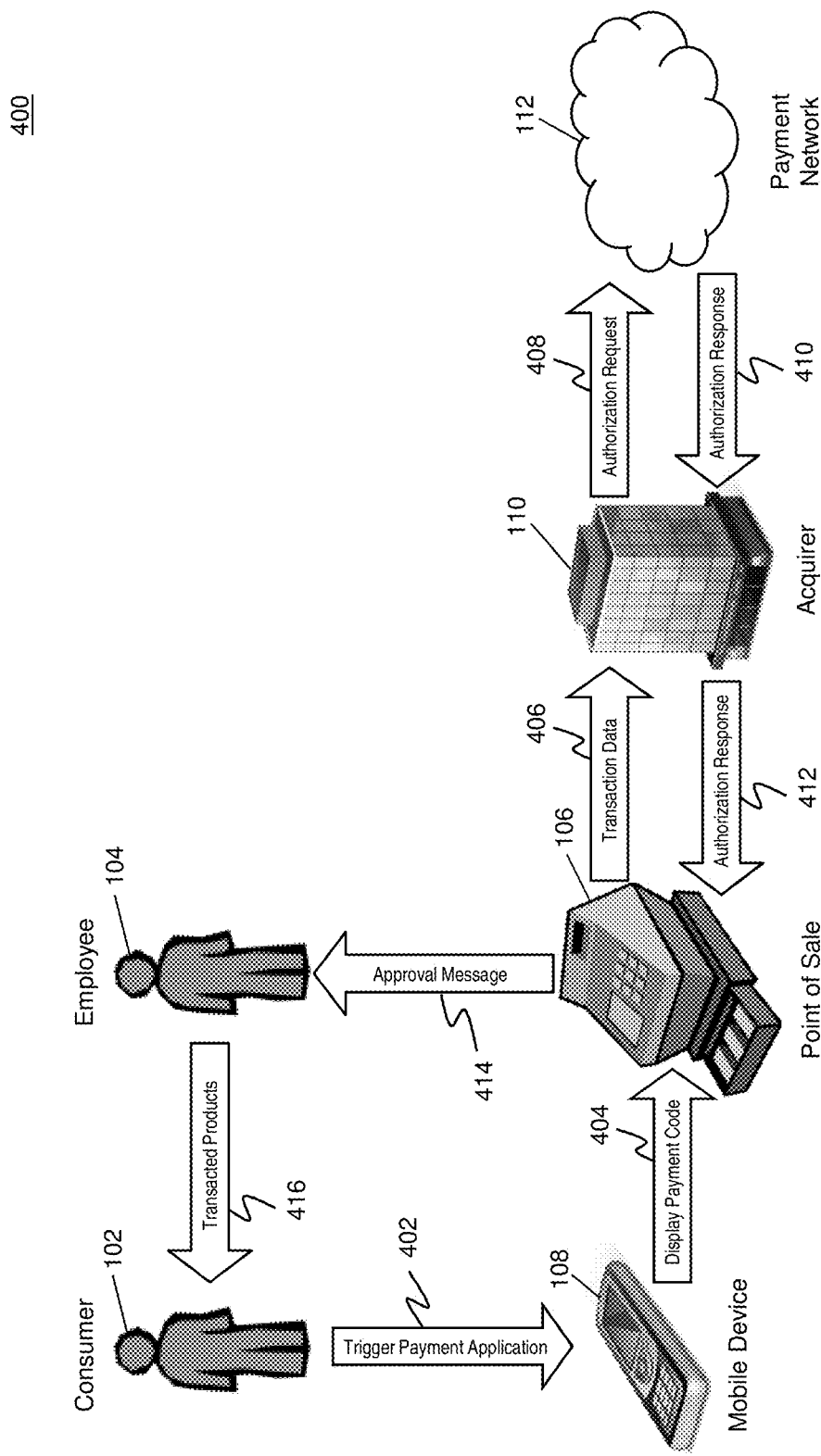
FIG. 4 is a flow diagram illustrating a method for the processing of a financial transaction funded via a virtual payment number conveyed using a mobile communication device in accordance with exemplary embodiments.

FIG. 4 illustrates an alternative method 400 for the processing of a financial transaction funded via a virtual payment number.

In step 402, the consumer 102 may trigger a payment application using the mobile device 108. In step 404, the mobile device 108 may display a machine-readable code encoded with the virtual payment number and indication of the virtual payment number as a limited use number to be read by the point-of-sale 106 (e.g., via the input unit 204) and decoded (e.g., via the processing unit 210). The point-of-sale 106 may then transmit the transaction data, including the virtual payment number and indication, to the acquirer 110, in step 406. In an alternative embodiment, in step 404 the mobile device 108 may display the virtual payment number, and the employee 104 may enter the virtual payment number and indication of the virtual payment number as a limited use number into the point-of-sale 106.

In step 408, the acquirer may submit an authorization request including the transaction data, virtual payment number, and indication to the payment network 112 for processing, and then may receive an authorization response in step 410. In step 412, the acquirer 110 may forward the authorization response to the point-of-sale 106, which may then display an approval message indicating the approval of the financial transaction as indicated in the authorization request, in step 414. Then, in step 416, the employee 104 may provide the transaction products (e.g., and a receipt for the financial transaction) to the consumer 102.

Method for Generating an Authorization Request

Figure 5:
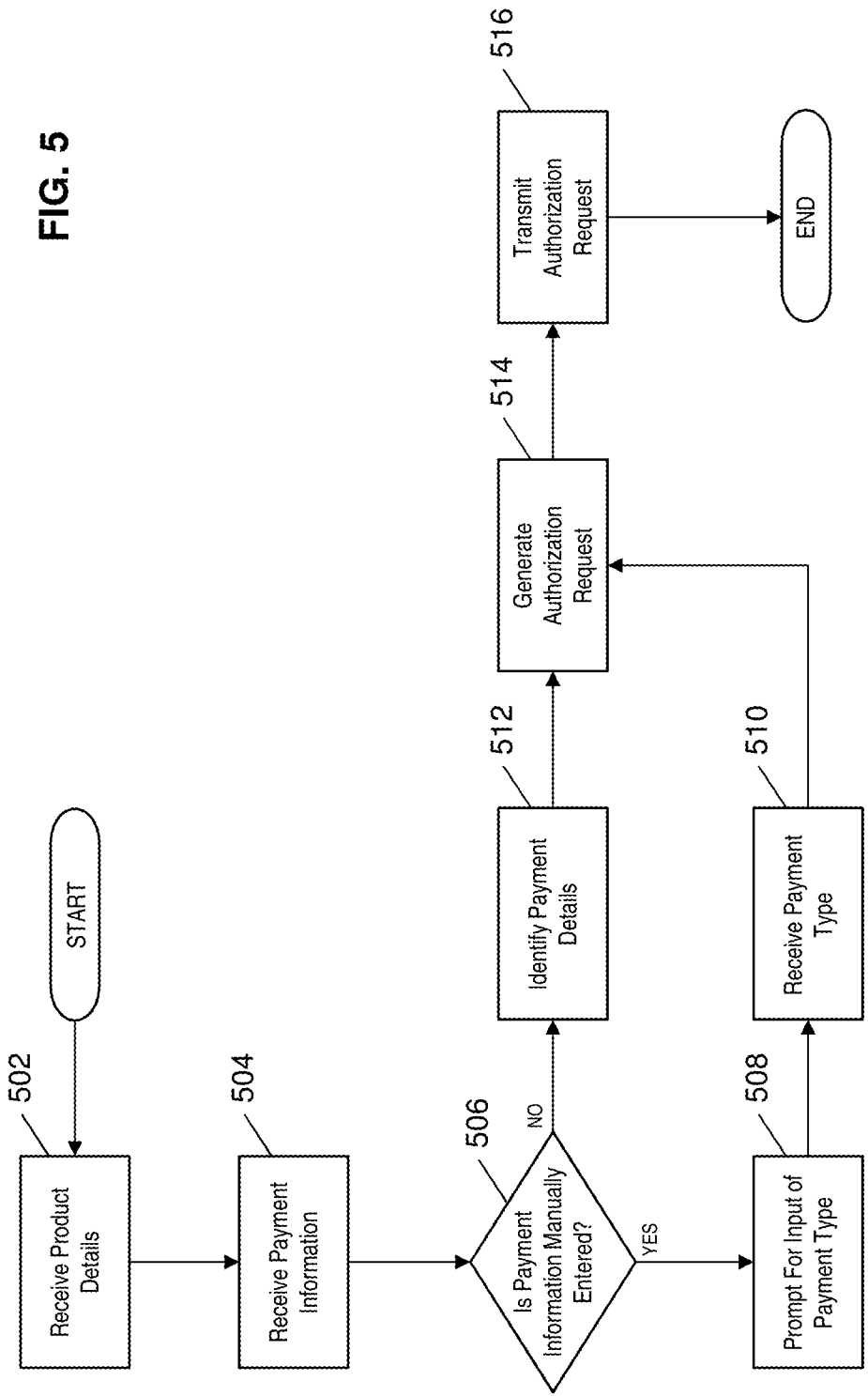
FIG. 5 is a flow chart illustrating a method for generating an authorization request in a point-of-sale device in accordance with exemplary embodiments.

FIG. 5 illustrates a method for generating an authorization request in the point-of-sale 106 as part of a financial transaction funded via a virtual payment number.

In step 502, the point-of-sale 106 may receive (e.g., via the input unit 204), product details for goods or services to be purchased as part of the financial transaction. Product details entered into the point-of-sale 106 and methods for the entering thereof will be apparent to persons having skill in the relevant art. In step 504, the point-of-sale 106 may (e.g., via the input unit 204) receive payment information for the funding of the financial transaction, including at least a payment number associated with a payment account to be used to fund the financial transaction.

In step 506, the processing unit 210 of the point-of-sale 106 may determine if the payment information was entered manually (e.g., via input by the employee 104). If the information was entered manually, then, in step 508, the point-of-sale 106 may prompt (e.g., via the display unit 208) the employee 104 for input of the type of payment. In step 510, the input unit 204 may receive the payment type as input by the employee 104 indicating the previously provided virtual payment number as being a limited use number. If, in the alternative, the payment information was determined as not being entered manually (e.g., read by a reading device as part of the input unit 204, received via near field communication, etc.), then, in step 512, the processing unit 210 may identify payment details from the received payment information. For example, the processing unit 210 may decode the virtual payment number and indication of the virtual payment number as a limited use number from a machine-readable code read by the input unit 204 in step 504, or the processing unit 210 may identify the virtual payment number and indication in a transmission received via near field communication. The employee 104 may be required to also enter the type of payment, or be given an opportunity to confirm it, the idea being that the virtual payment number is a limited use number, and therefore perceived to be more secure, and ease acceptance to the employee 104/merchant 116.

In step 514, the processing unit 210 may generate an authorization request for the financial transaction. The authorization request may include at least transaction data, the virtual payment number, and a data element indicating the virtual payment number as being a limited use number. In some embodiments, the authorization request may be formatted pursuant to the ISO 8583 standard. In step 516, the transmitting unit 206 of the point-of-sale 106 may transmit the authorization request to the acquirer 110 and/or payment network 112 for processing of the financial transaction.

Figure 6:
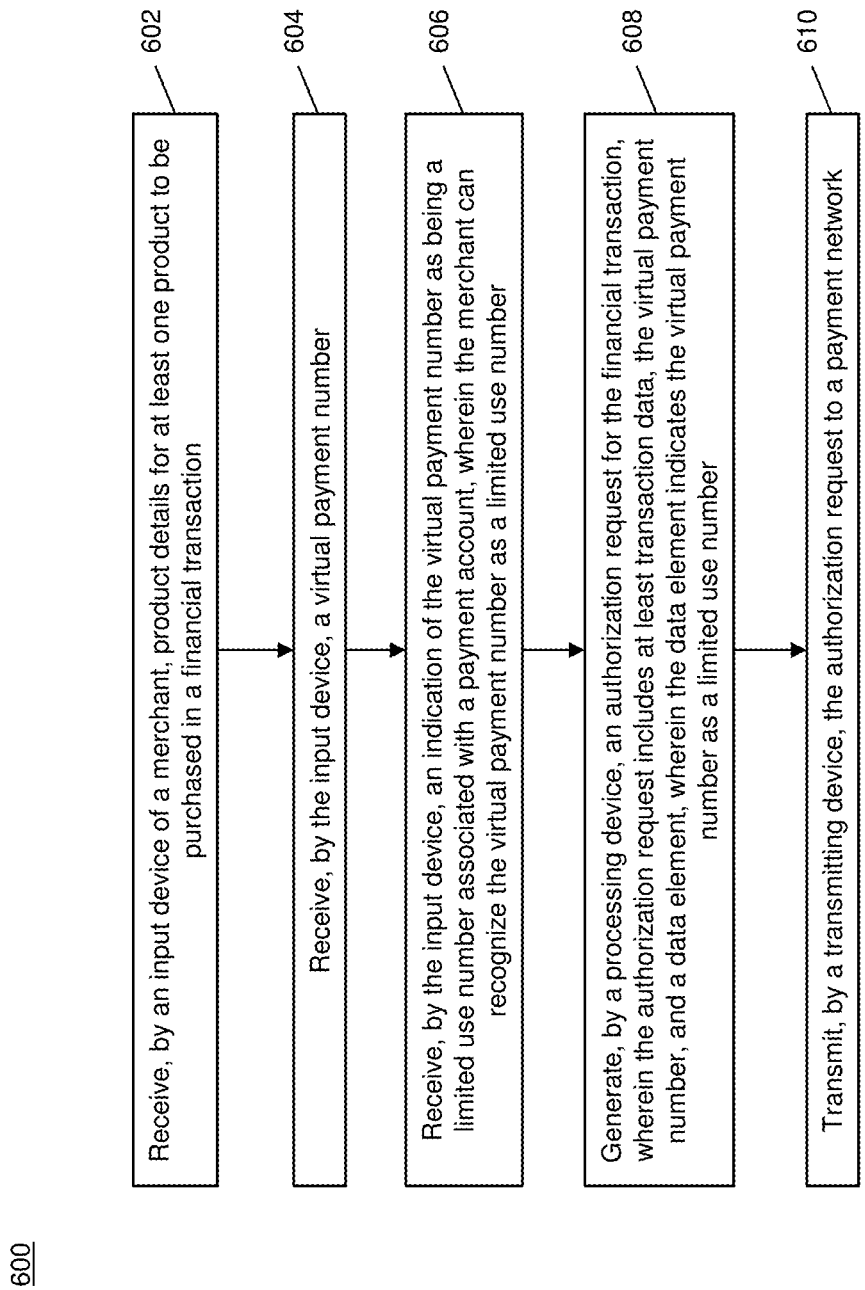
FIG. 6 is a flow chart illustrating an exemplary method for processing a financial transaction funded via a virtual payment number in accordance with exemplary embodiments.

Exemplary Method for Processing a Financial Transaction Funded Via a Virtual Payment Number FIG. 6 illustrates an exemplary method 600 for the processing a financial transaction that is funded via a virtual payment number as a limited use number.

In step 602, an input device (e.g., the input unit 204) of a merchant may receive product details for at least one product to be purchased in a financial transaction. In step 604, the input device 204 may receive a virtual payment number. In one embodiment, the input device 204 may be a keyboard or number pad, and the virtual payment number may be received by the input device 204 via manual input of the virtual payment number by a user (e.g., the employee 104). In an alternative embodiment, the input device 204 may receive the virtual payment number via near field communication. In a further embodiment, the virtual payment number may be transmitted via near field communication by a mobile communication device (e.g., the mobile device 108). In another alternative embodiment, receiving the virtual payment number may include reading, by the input device 204, a machine-readable code, and identifying, by a processing device, the virtual payment number encoded in the machine-readable code.

In step 606, the input device 204 may receive an indication of the virtual payment number as being a limited use number associated with a payment account, wherein the merchant can recognize the virtual payment number as a limited use number. In embodiments where the virtual payment number may be encoded in a machine-readable code, the indication of the virtual payment number as being a limited use number may also be encoded in the machine-readable code. In a further embodiment, the machine-readable code may be a bar code. In embodiments where the input device 204 reads the machine-readable code, the machine-readable code may be displayed by the mobile communication device 108. In one embodiment, the virtual payment number may be limited in use by at least one payment control, wherein the at least one payment control is set by a user (e.g., the consumer 102) associated with the payment account associated with the limited use number.

In step 608, an authorization request for the financial transaction may be generated by a processing device (e.g., the processing unit 210), wherein the authorization request includes at least transaction data, the virtual payment number, and a data element, wherein the data element indicates the virtual payment number as a limited use number. In some embodiments, the indication of the virtual payment number as a limited use number may be included as a new value in an existing data element. In one embodiment, the authorization request may further include a second data element indicative of the financial transaction as a card-present transaction. In step 610, the authorization request may be transmitted, by a transmitting device (e.g., the transmitting unit 206) to a payment network (e.g., the payment network 112).

Computer System Architecture

Figure 7:
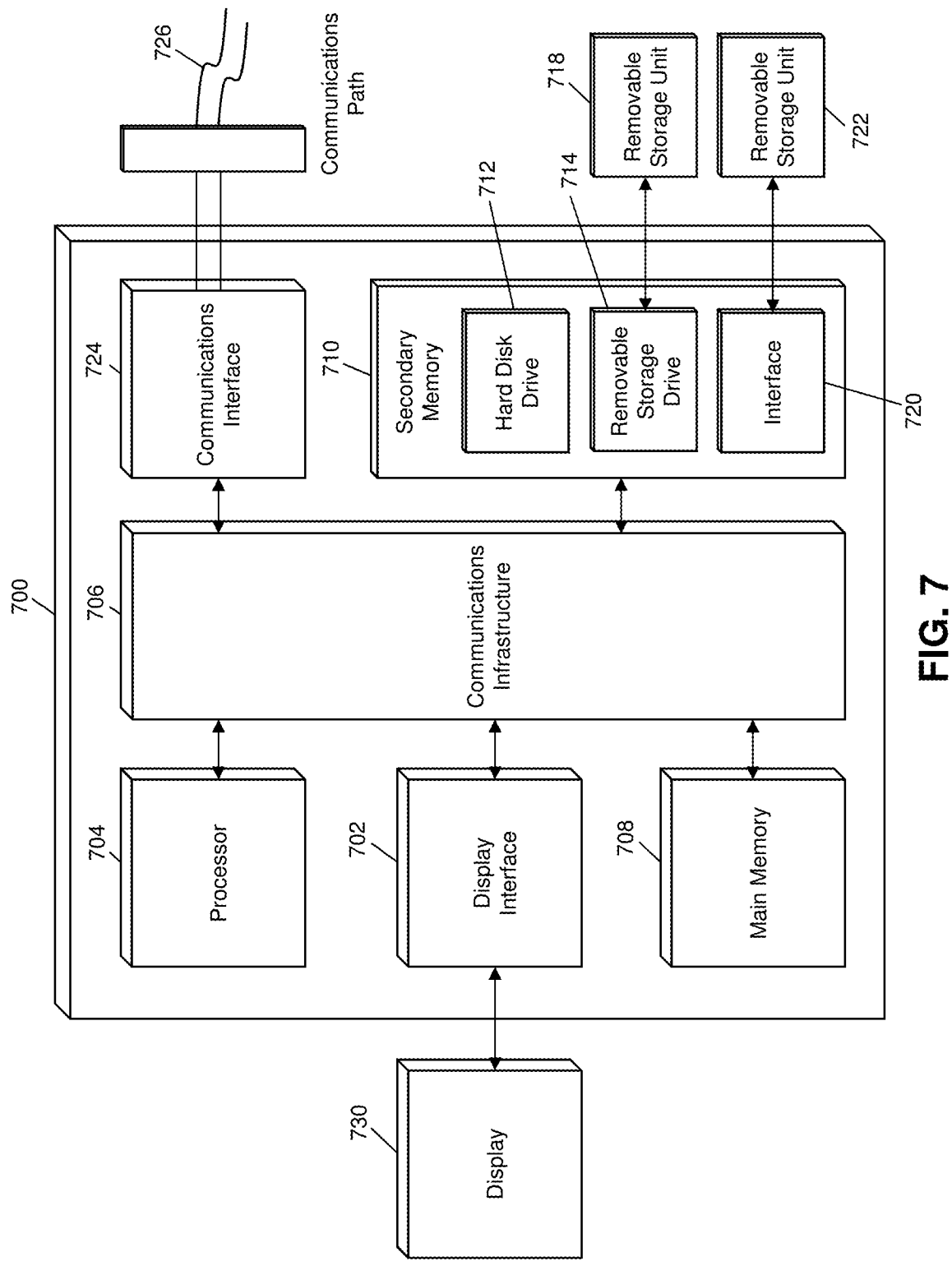
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the point-of-sale 106 and the mobile device 108 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. The processor device 704 may be connected to a communication infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive, the removable storage unit 718 may be a floppy disk. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

Computer program medium and computer usable medium may refer to memories, such as the main memory 708 and secondary memory 710, which may be memory semiconductors (e.g. DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 4A, 4B, 6, and 7, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Techniques consistent with the present disclosure provide, among other features, systems and methods for processing financial transactions funded via virtual payment numbers. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for improving functionality of a merchant point of sale device, comprising:
   receiving, by at least one input device of a merchant point of sale device, product details for at least one product to be purchased in a financial transaction, wherein the at least one input device is configured for at least wireless communication;
   receiving, by the at least one input device of the merchant point of sale device via wireless communication from a mobile communication device, a virtual payment number, wherein the at least one input device reads a machine-readable code encoded with the virtual payment number, the machine-readable code being one of a bar code or a Quick Response (QR) code;
   receiving, by the at least one input device of the merchant point of sale device, an indication of the virtual payment number as being a limited use number associated with a payment account, wherein the merchant device is configured to recognize the virtual payment number as a limited use number;
   generating, by a processing device having one or more processors, an authorization request for the financial transaction, wherein the authorization request includes at least transaction data, the virtual payment number, and a first data element indicates indicative of the virtual payment number as a limited use number, and a second data element indicative of the financial transaction as a card-present transaction; and
   transmitting, by a transmitting device connected to a communication infrastructure, the authorization request to a payment network over the communication infrastructure, wherein the transmitting device is configured for wired or wireless transmission over the communication infrastructure.

2. The method of claim 1, wherein the input device comprises at least a keyboard or number pad and the virtual payment number is received by the input device via manual input of the virtual payment number by a user.

3. The method of claim 1, wherein the indication of the virtual payment number as being a limited use number associated with a payment account is encoded in the machine-readable code.

4. The method of claim 1, wherein the machine-readable code is displayed by a mobile communication device.

5. The method of claim 1, wherein the virtual payment number is limited in use by at least one payment control, and wherein the at least one payment control is set by a user associated with the payment account associated with the limited use number.

6. A system for improving functionality of a merchant point of sale device, comprising:
   an input device of a merchant device configured for at least wireless communication with a mobile communication device and configured to receive:
      product details for at least one product to be purchased in a financial transaction,
      a virtual payment number encoded in a machine-readable code being one of a bar code or a Quick Response (QR) code, and
      an indication of the virtual payment number as being a limited use number associated with a payment account, wherein the merchant device is configured to recognize said virtual payment number as a limited use number;
   a processing device having one or more processors, the processing device configured to generate an authorization request for the financial transaction, wherein the authorization request includes at least transaction data, the virtual payment number, and a first data element, indicative of the virtual payment number as a limited use number, and a second data element indicative of the financial transaction as a card-present transaction; and
   a transmitting device having one or more components for wired or wireless transmission over a communication infrastructure, the transmitting device configured to transmit the authorization request to a payment network over the communication infrastructure.

7. The system of claim 6, wherein the input device comprises at least a keyboard or number pad and the virtual payment number is received by the input device via manual input of the virtual payment number by a user.

8. The system of claim 6, wherein the indication of the virtual payment number as being a limited use number associated with a payment account is encoded in the machine-readable code.

9. The system of claim 6, wherein the machine-readable code is displayed by a mobile communication device.

10. The system of claim 6, wherein the virtual payment number is limited in use by at least one payment control, and wherein the at least one payment control is set by a user associated with the payment account associated with the limited use number.

* * * * *